July 21, 1970  R. A. SMITH  3,520,969
METHOD OF MAKING A BOWLING PIN
Filed Aug. 1, 1966

INVENTOR.
RICHARD A. SMITH
BY
*Wentworth B. Clapham*
ATTORNEY

United States Patent Office 3,520,969
Patented July 21, 1970

3,520,969
METHOD OF MAKING A BOWLING PIN
Richard A. Smith, Cornwall-on-the-Hudson, N.Y., assignor to American Machine & Foundry Company, a corporation of New Jersey
Continuation-in-part of application Ser. No. 534,946, Jan. 21, 1966. This application Aug. 1, 1966, Ser. No. 569,371
Int. Cl. B29d 3/00; B32b 31/06
U.S. Cl. 264—262     6 Claims

ABSTRACT OF THE DISCLOSURE

A method for making a plastic encased bowling pin having a core and a plastic cladding substantially completely covering the core. A pre-shaped core is centered along with a partially cured preformed plastic material in a mold. Pressure is applied to the mold enclosing the core and preformed plastic material until the preformed material flows and forms an integral enclosing layer on the core. The material is then cured. A preferred plastic material for the enclosing layer is polyurethane.

---

This is a continuation-in-part of application Ser. No. 534,946 filed on Jan. 21, 1966, which in turn is a continuation of application Ser. No. 170,453 filed on Feb. 1, 1962 and now abandoned.

This invention relates to an improved method for manufacturing plastic-coated bowling pins.

It has been the conventional practice in preparing plastic-coated wood pins to apply to the wood core a plurality of layers until a plastic coating of sufficient depth has been provided. This procedure is time-consuming, cumbersome, and expensive and often results in a plastic coating which delaminates from the pin core under the rigorous impact conditions of use.

The present invention is concerned with an improvement in the art of manufacturing plastic-coated bowling pins wherein a surface cladding comprising a single polymeric composition is applied. Specifically a cladding of polyurethane plastic, which is first prepared as a preform, is applied to the core and molded thereof so that the plastic comprising the preform flows and encases the core. The bowling pin so encased is relatively easily manufactured, is attractive, and has excellent durability and soil resistance.

In summary, the present invention is concerned with the manufacture of plastic-coated wood core bowling pins in which the protective plastic layer or cladding applied to the wood core is prepared as a preform and applied as a single layer and in one operation. This technique avoids the need for various intermediate layers and operations e.g., perforating the surface, applying impregnant or prime coatings for the wood, sealer coats and the like; all of which heretofore were applied as successive layers in separate operations, and were considered necessary, in addition to the main protective coating, in order to provide a commercially acceptable bowling pin.

Preferably the bowling pin core is formed so that it is provided with an undercut at the base to allow the formation, integrally with the surface layer of a base as the plastic preform flows around the pin core in the mold. Alternately, however, a separate base may be affixed to the bowling pin in a conventional manner after the bowling pin core is covered. Although the invention herein provided is directed primarily to application in conjunction with wood core bowling pins, the invention also has advantageous applications to bowling pin cores of plastic and metal, including foamed plastic and metal compositions. The invention may also be employed in conjunction with reinforced cores such as those utilizing mesh fabric envelopes e.g., nylon webbing, knitted socks, etc., over the pin.

It is an object of the present invention to provide a method for making a polyurethane plastic-coated bowling pin of increased durability and resistance to soilage, and at less cost, in which a single composition is utilized as the plastic layer.

It is a further and more specific object of the present invention to provide a method for encasing a bowling pin in a single layer of polyurethane which has previously been fabricated into preforms.

It is a further object to provide a method for making a plastic coated pin having a base formed integrally with the surface cladding of the pin.

Additional objects and advantages will become apparent as the description of the invention progresses.

In order that the manner in which these and other objects are attained, in accordance with the invention, can be better understood, reference is made to the accompanying drawings wherein.

In order that the method of the invention can be best understood, the general nature of the finished bowling pin will first be described with reference to the drawings.

Figure 3:
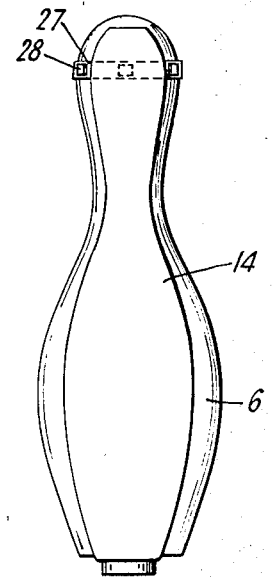
FIG. 3 illustrates the general configuration and approximate dimension relative to the bowling pin core of a partially cured polyurethane preform used in the process of the invention.

In the embodiment illustrated, pin 5 comprises a pin body or core 6 of maple or other hardwood, although metal, such as magnesium or aluminum, or plastic foam cores may also suitably be employed having a conventional dowel support recess 10. The core is encased in accordance with the invention with a cladding or cover 7. In utilizing the single composition layer as taught by the present inventive concept, it is unnecessary to follow the prior art technique of pretreating the core with a plurality of layers. In accordance with the invention, a single layer of polyurethane resinous composition is used in lieu of the multiple coat system heretofore required. The technique found to give best results is to prepare a preform 14 generally of a contour such as shown in FIG. 3, two of which are suitably secured to core 6. In the illustrated embodiment, two preforms 14 on opposite sides of core 6 have been found to give satisfactory results. Any other suitable number could be used, if desired, depending on size and thickness. Preforms 14 have such tackiness that they adhere to core 6 when pressed thereagainst. The core preform assembly is then placed in mold 17 and molded under heat and pressure until the preform polyurethane composition flows around the core to produce an essentially uniform layer or cladding 7 over the entire periphery of the core.

As stated above, the invention is herein described in conjunction with a wooden core. It is contemplated, however, that the advantageous features of the invention herein set forth may be applied also in conjunction with plastic cores, and may comprise a foamed core, prepared, for example, in the manner described in U.S. Pat. 3,147,975, granted Sept. 8, 1964, entitled "Plastic Bowling Pin," in which applicant is a co-inventor, as well as metal cores. Additionally, it is fully within the contemplation of the invention to employ the unitary coating of the invention in conjunction with the fabric mesh envelope or knitted sock described in detail in applicant's U.S. Pat. 3,240,646.

In the preferred embodiment of the invention, the polyurethane surface layer or cladding 7 is molded directly on the core and attaches thereto with great affinity; no primer layer or impregnant is used, or is necessary or desirable. Except for some flash which may occur in molding, each pin removed from a mold usually has a smooth, glossy and attractive appearance. Insignia and neckbands are then applied in order to complete the preparation of the pin for commercial use.

Figure 1:
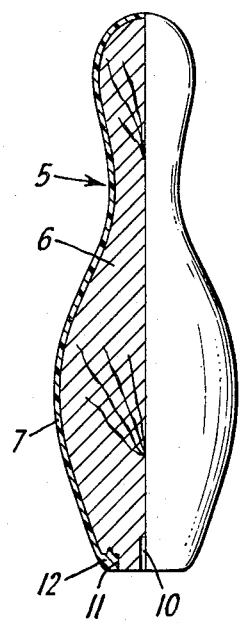
FIG. 1 is a view, partially in section, of a bowling pin having a wooden body, produced in accordance with the invention, in which the wood is covered with a protective cladding comprising a layer of polyurethane resin and an integrally formed base.

As shown in FIG. 1 of the drawing, core 6 is provided with a recess 11 at its butt or base end. As the plastic flows, during the molding operation, an extra thickness or bead 12 is formed. It adheres to the core and conforms exactly to the contours of recess 11. Integral base 12 which forms an important feature of the invention greatly reinforces the base of a pin. It reduces core damage usually due to conventional grooving in pin bases such as required for effectively seating separate bases. The construction embodying the invention reduces manufacturing costs because it eliminates several machining and assembling operations. It also increases durability of base, and most important the service life of the pin.

The polyurethane protective layer components utilized in the invention are commercially available. The comprise elastomeric materials derived from liquid diisocyanate or triisocyanate compositions reacted with alcohols, i.e., ester and/or ether polyols.

The preparation of polyurethane compositions usually involves a two-step process in which the polyol is heated with an excess of an organic polyfunctional, i.e., a di-, or tri-, isocyanate and then mixed and reacted with a suitable diamine such as 4,4′ methylene-bis (2 chloroaniline), available commercially as MOCA; or methylene dianiline, for example.

Of various polyols, which may be used in the reaction with the polyfunctional organic isocyanates, e.g., diisocyanates, so as to prepare the isocyanate-terminated polymer, the polyalkylene ether glycols are preferred. These glycols have the general formula:

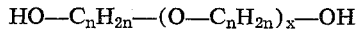

$$HO-C_nH_{2n}-(O-C_nH_{2n})_x-OH$$

wherein the value of $x$ is such as to give a molecular weight less than about 8,000 when reacted with the isocyanate to form the polyurethane prepolymer, and $n$ is an integer having a value of at least 2 and not greater than 8.

When $C_nH_{2n}$ is $C_2H_4$, the polyol may be considered as a derivative of ethylene oxide or ethylene glycol. When $C_nH_{2n}$ is

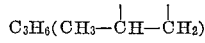

$$C_3H_6(CH_3-CH-CH_2)$$

the polyol can be considered as a derivative of propylene oxide or propylene glycol. When $C_nH_{2n}$ is $C_4H_8$, the polyurethanes comprise those available commercially from E. I. DuPont as Adiprenes. These polymers may be considered derivatives of 1,4-butanediol, $HO(CH_2)_4OH$, or of tetrahydrofurane

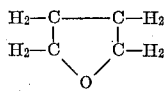

Where polyether polyols of the general formula: $HO-C_4H_8-(O-C_4H_8)_xOH$ are reacted to various degrees with tolylene diisocyanate TDI in excess, products of varying molecular weights are derived. Three polyurethanes, i.e., polytetramethylene ether glycols of excellent properties may be characterized within the general formula by the following data:

| Wgt. percent free NCO | Approx. Mol. Wgt. |
|---|---|
| 4 | 3,000 |
| 6 | 1,500 |
| 9 | 850 |

In accordance with the present invention, the preferred polyalkylene ether glycol is the addition product of tetramethyleneglycol having a molecular weight of at least 500 and a free NCO percentage of at least 4%. This is a simple product formed from a relatively few molecules but the polyol may be the inter-reaction product from many molecules. Where propylene oxide is used, for example, a branched chain is obtained.

The fundamental polyol unit need not be a simple glycol with adjacent hydroxyls but may be a diol where the hydroxyls are not adjacent as in the following: $HO-(CH_2)_4OH$. The simplest polyether polyol from this base is: $HO(CH_2)_4-O-(CH_2)_4OH$. Also there may be other than four methylene groups and the polyether polyol may be of a more complex type represented by a condensation product of two or more different polyols (or polyols and ethylene oxide type compounds). Examples are hexane triol and propylene oxide or hexane triol, pentane diol and propylene oxide. Many isomers and mixtures may be in the product. Suitable polyols, for example, are disclosed in U.S. Pats. 2,901,467 and 2,917,489.

The isocyanates employed in synthesizing the polyurethanes may be aliphatic or aromatic. The most common aliphatic diisocyanate is methylene diisocyanate, commonly known as MDI. The most commonly used aromatic diisocyanate is tolylene diisocyanate, popularly known as toluene diisocyanate (TDI). This name is used to include the isomers and mixtures of isomers of tolylene diisocyanate. The most commonly used of all diisocyanates is the TDI 80–20 mixture of 2,4-tolylene diisocyanate and 2,6-tolylene diisocyanate. Each NCO radical in these compounds may react in any one of various fashions. Due to the reactions possible, the large molecules formed will have multiple cross-links; the more numerous these are, in general, the more rigid and hard the final polymer will be; the less numerous, the softer and more flexible the polymer will be. The reaction to form a macromolecule provides a thermosetting polymer. In general, these can be post-formed by the application of heat and pressure, so that materials, in fact, are thermoplastic thermosets. During the forming operation, the partially cured preform is further cured but not necessarily to completion. Thereafter the product can be virtually post-cured by heating in a tunnel or allowing it to stand at room temperature for several weeks. Usually normal periods of storage prior to delivery are sufficient to complete the cure.

Although reactions go to virtual completion, it should be noted that they are reversible, so that new equilibria can be established with changes in properties. Extreme sensitivity to moisture of some polyurethane polymers is an example of this. As a class, there is a sensitivity to oxidative reactions; in general, otherwise, chemical and solvent resistance is good.

Representative of the typical organic isocyanates which may be used in preparing the novel coating compositions of the present invention, there may be mentioned m-phenylene diisocyanate, toluene-2,4-diisocyanate, hexamethylene-1,6-diisocyanate, tetramethylene - 1,4 - diisocyanate, cyclohexane-1,4-diisocyanate, naphthylene-1,5-diisocyanate, 1-methoxyphenyl 1,2,4-diisocyanate, methylene-bis-(4-phenylisocyanate), 4,4′- biphenylene diisocyanate. Mixtures of toluene-2,4- and 2,6-diisocyanate may be used. In general, the diisocyanates having the isocyanate groups substituted on aromatic rings are preferred. From about 4.0 to 11.0 molar proportions of the organic diisocyanate reactant is generally employed. Other polyfunctional isocyanates may also be used such as the triisocyanates, e.g., toluene triisocyanates, alone or admixed with one or more diisocyanates. In this regard, see for example U.S. Pat. 2,531,392.

In applying the coating to the pin cores, any appropriate molding appaartus may be employed or adapted from the variety of commercially available molding machines.

Figure 2:
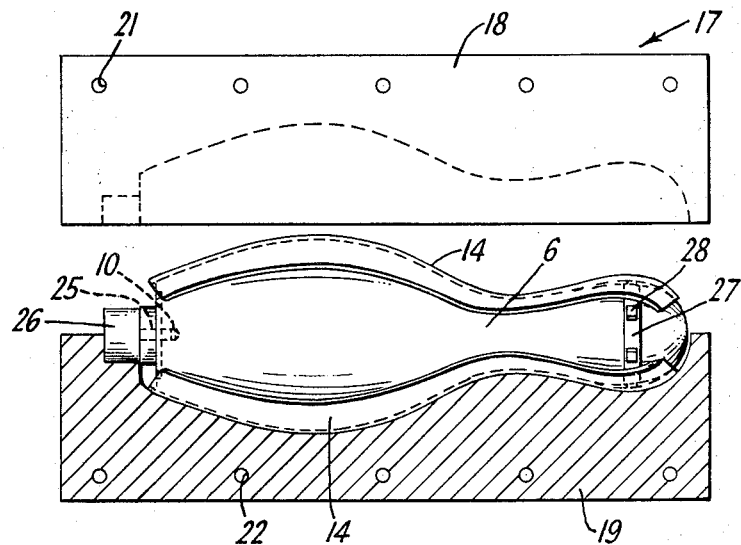
FIG. 2 is an elevational view showing a mold which may be employed to support the pin core and plastic preforms positioned thereon, and wherein the plastic flows over the core to encase the bowling pin in a polyurethane composition.

One apparatus for molding the preform composition over the pin core which is illustrative only is shown in FIG. 2 of the drawing. The mold 17 shown comprises mold halves 18 and 19 which may be suitably equipped with heating elements 21 and 22. Alternately to provide the requisite heat, molds may be placed between heated platen. Provided to keep the core 6 centered in the mold recesses 23 and 24 of mold halves 19 and 20, respectively, is a centering block 26 having a pin 25 which extends into recess 10 in the pin core and is conveniently arranged to form the base and to be accommodated by the mold and is securely held in the mold. As an aid in assuring more precise and prompt centering of the core in the mold, a ring or band 27 provided with outwardly extending projections 28 of sufficient thickness to center the head end of the core is affixed to the pin core head, or separate patch spacers of suitable thickness to serve the same purpose, which are intermittently stuck to the pin head (not shown), may be used, before the core 6 with preforms 14 as a unit is introduced into the mold. Preferably the band 27 (or spacers) comprise a composition which is the same or similar to the preform composition from which the protective surface layer is formed and upon molding and curing blends into it as an integral part. It may be desirable, depending on the mold and its position and the rigidity of the pin core holding means, to form the band 27 (or spacers) of a composition which is wholly compatible with but melts at a higher temperature than the polyurethane preforms 14 or it may be the same composition at a different cure stage.

The following examples, in which the parts recited are parts by weight, are provided in order that the invention may be better understood. The examples are illustrative only and should not be interpreted as indicative of limitation on compounds or conditions stated. In each example, unless otherwise stated, two preforms are used and these are of size designed to apply a plastic cladding or envelope of 50 mils to the surface of the bowling pin cores.

EXAMPLE 1

In a suitable apparatus equipped for mixing two solutions, (I) and (II), to prepare the polyurethane preforms are mixed at room temperature and deposited in a preform mold having a recess corresponding essentially to the lengthwise shadow of the pin and having a depth of approximately 150 mils. The mixture is used in approximately stoichiometric proportions, i.e., about 100 parts by weight of solution (I) and about 86.5 parts by weight of solution (II)

Solution (I) is composed: Percent by weight
    Adiprene LD-315 [1] _____ 70
    Methylethyl ketone _____ 30
Solution (II) is composed of:
    Methylene dianiline _____ 15
    Mesityl oxide _____ 85

[1] Polyurethane of E. I. du Pont de Nemours having 9% by weight free NCO and a molecular weight of approximately 850.

The molded preforms 14 having the general shape shown in FIG. 2 are partially dried to allow for some evaporation of the solvent and then partially cured for about one hour at a temperature of about 95° C. (203° F.) and then removed from the mold.

Two of the preforms which are pliable and assume the contour of the bowling pin core when pressed against it, are applied to a maple bowling pin core which is centered in a mold as shown and described in connection with FIG. 2 and heat and pressure are applied, i.e., by heating in a mold for 6–8 minutes at 100° C. (212° F.) until the preform composition flows and forms a uniform envelope on the core. The cladded core is removed from the mold. It is then subjected to additional treatment which converts it into a completed pin. The cure is continued subsequently after the additional treatment by passing through an oven at 65° C. (149° F.) for 40–90 minutes or by storage for several weeks at moderate temperatures.

Bowling pins coated with the above material have excellent characteristics and a markedly superior durability to pins with present commercial coatings.

EXAMPLE 2

This example proves an alternate composition useful in preparing preforms which are then placed about a core centered in a mold, such as that described in conjunction with FIG. 2. The procedure of Example 1, is repeated using instead the following system.

A two-part system is mixed in suitable equipment and introduced into the preform mold. The formulation involves a polyurethane modified with an epoxy.

Solution I: Parts by weight
    Adiprene LD-167 [2] _____ 40
    MOCA [3] _____ 34
    Epon 815 [4] _____ 60

[2] Polyurethane of E. I. du Pont de Nemours Co. having 6% by weight NCO and a molecular weight of approximately 1500.
[3] 4,4' methylene bis (2-chloroaniline).
[4] Shell Chemical Company liquid epoxy resin containing butyl glycidyl ether as reactive diluent.

The polyurethane and epoxy are mixed at room temperature and the MOCA at 100° C. (212° F.) is added. The temperature of the mix is approximately 50° C. (122° F.). The reform is molded and cured for 40–90 minutes at approximately 120° C. (250° F.). The preform composition applied to the core, as shown in FIG. 2, is thereafter placed in mold (at same temperature and time) and cured at a temperature of approximately 127° C. (260° F.) for approximately four hours.

EXAMPLE 3

The procedure of Example 1 is repeated using instead the following two-part composition:

| | Percent by weight | Temperature |
|---|---|---|
| Solution I: | | |
|   Adiprene LD-213 | 95 | 185° F. (85° C.). |
|   TiO₂ pigment | 5 | |
| Solution II, molten MOCA | 25 | 250° F. (121° C.). |

Solution I and II are mixed and poured into a mold and formed into preforms 14 which weigh 90–100 grams. The preforms are aged in the molds at room temperature 40–60 minutes. After the preforms are applied, as in Example I, to the bowling pin core, the pin core with preform 14 adhering thereto is placed in a mold, preheated for 60–75 seconds at 230° F. (110° C.) and partially cured for 6–10 minutes at 230° F. (110° C.) to a point where it can be removed from the mold and handled.

EXAMPLE 4

This example provides an alternate formulation which also produces satisfactory results when applied to a wood bowling pin core. The procedure of Example 1 is repeated using the following two-part composition:

Formulation of the two-part mix is:
        Parts by weight
Adiprene LD-315 (100° C.) _____ 100
MOCA (100° C.) _____ 25–30

The mix is charged into the preform mold cavity at approximately 85° F. (185° F.) and held for 40 to 60 minutes at room temperature. Two of the preforms are thereafter placed on a wood core which is positioned in a mold, the mold is closed in a hydraulic press providing 12–20 tons pressure for 7–10 minutes at 110° C. (230° F.). A mold with heated platens is used. Cure is then effected by heat for 40 minutes at 63° C. (145° F.).

Cores which have been cladded in accordance with examples given above, i.e., cladded units, when removed from the molds may have some flash. This is removed in any known manner and each cladded unit is provided with suitable decorative indicia, trademarks, approval notices and neck bands all applied in known manner. Center block 26 is removed and the pins are ready for sale. If a mold release agent has been used, it may be necessary to clean the surface of the cladding by the use of a suitable conventional solvent, such as a toluene solution before the pins are decorated.

When a polyurethane topcoat is applied over a cladded unit adhesion usually is excellent. However, if the cladding is almost at a cured stage adhesion can be enhanced by solvent sensitization, e.g., dipping or washing with methylene chloride.

Whether or not a sensitizing agent is used, each cladded unit is decorated in the manner described. The polyurethane topcoat is applied to the surface of each cladded unit by conventional means, e.g., spraying, dipping or flow coating. The coated units are then cured by conventional means for 1–1½ hours as described in Example 1. At the end of this period the finished pins are cooled, inspected and packaged for sale. It will be appreciated that the application of decorative mediums and indicia also can be effected upon the topcoat.

It will be apparent to those skilled in the art that various modifications may be made in the teaching presented without departing from the scope of the invention. Accordingly, the invention is not to be limited except insofar as necessitated by the appended claims.

What is claimed is:

1. A method of making a bowling pin having a preshaped core encased in a synthetic resin protective cover comprising, molding a partially cured preform of polyurethane, applying at least one such preform to said pin core, centering the bowling pin core with said partially cured preform in a mold, by supporting one end of the pin core with a first support means and supporting the head end of the pin core by placing a preformed material having spaced elevated points of support on the head end of the pin core, so that the head end of the pin core is centered relative to the walls of the mold, closing said mold under heat and pressure to cause the said partially cured preform to flow along the pin core and said preform with spaced elevated points of support to at least become deformed and both said partially cured preform and said preform with spaced elevated points of support to form an integral, adhering, enclosing layer on said pin core and curing said polyurethane.

2. The method defined in claim 1 where a plurality of polyurethane preforms are affixed to said core prior to its placement in said mold.

3. The method of claim 2 wherein two preforms are employed and wherein the total composition thereof is sufficient to form a suitable base and to apply a layer on said body of from about 20 to about 200 mils.

4. The invention defined in claim 1 including the step of preheating said mold prior to the placement of a core and polyurethane preform attached thereto in said mold.

5. The invention defined in claim 4 including the steps of preheating said mold to a temperature of approximately 230° F. and maintaining said temperature at approximately 230° F. for approximately 6–10 minutes to effect the distribution of said polyurethane preform about and upon the surface of said core.

6. The method of claim 1 wherein said core is provided with a cut-out at its base so that as said preform composition flows, a base for said pin is formed integrally with said enclosing layer.

References Cited

UNITED STATES PATENTS

| | | | |
|---|---|---|---|
| 2,684,504 | 7/1954 | Sell | 264—259 X |
| 2,787,024 | 4/1957 | Smith | 264—275 |
| 2,850,767 | 9/1958 | Ford | 264—275 |
| 2,568,274 | 9/1951 | Clark | 264—273 X |
| 2,804,400 | 8/1957 | Kelly. | |
| 3,109,201 | 11/1963 | Dulmage. | |
| 3,130,102 | 4/1964 | Watson | 156—228 |
| 3,344,468 | 10/1967 | Moslo | 264—275 X |

FOREIGN PATENTS 657,821  9/1951  Great Britain.

ROBERT F. WHITE, Primary Examiner

J. H. SILBAUGH, Assistant Examiner

U.S. Cl. X.R.

264—266, 275; 273—82; 18—36